Patented Nov. 25, 1952

2,619,426

UNITED STATES PATENT OFFICE 2,619,426

PLASTIC REFRACTORY

Herbert H. Greger, Rockville, Md.

No Drawing. Application July 11, 1951,
Serial No. 236,283

10 Claims. (Cl. 106—63)

This application is a continuation-in-part of my copending application Serial No. 746,873 filed May 8, 1947.

This invention relates to an air setting refractory material. More specifically, the invention contemplates a material which, upon the addition of water, forms a tacky mass capable of setting in air to provide a solid refractory material having high mechanical strength.

It is the usual practice in compounding plastic refractory masses which may be used in the production of various refractory shapes to include relatively large quantities of clay to give the mix the desired workability. The clay being of a plastic nature allows the shaping of the mass to the desired form, which will be retained during the subsequent firing of the mass. Unfortunately the strength of the moist clay before firing is relatively low and the strength is not increased during the firing operation until a ceramic bond actually develops. There is also an objection to the use of a large percentage clay because of the high shrinkage resulting when sufficient clay is included in the mix to produce a material having the necessary workability.

Alkali metal silicate solutions have been used to increase the unfired or green strength of plastic refractories. Unfortunately the alkali present acts as a flux and reduces the softening temperature of the final refractory product. Furthermore, the silicates tend to form carbonates during storage or when they come in contact with an atmosphere containing carbon dioxide and often are not suitable for use after extended storing. Still another objection to the use of alkali metal silicate to increase the green strength of the plastic refractories is the water soluble nature of the bond which is produced before vitrification. Upon vitrification, high alkali silicate glasses of high coefficient of thermal expansion form often causing cracking of the bonding mass on repeated heating and cooling.

Organic binders of the nature of glues have been incorporated in refractory mixes to increase the unfired strength of the material. While high green strengths are possible with the organic binding agents, they tend to char upon heating and thus lose their strength long before a ceramic bond is formed.

In many cases a porous filler is used to produce a plastic refractory material having good insulating qualities and a low density. Fillers of this type increase the difficulties of obtaining a satisfactory mix having the necessary workability because of the need for relatively large quantities of bond clay and a large amount of water for plasticity of the mass. If a bonding agent is added to the mix to increase its green strength, the porous nature of the filler results in much of the bonding agent going into the body of the filler thereby making high concentrations of the binding agent necessary.

It is an object of this invention to provide a plastic refractory with suitable workability and yet having a low clay content with the resultant low shrinkage on firing.

Another object of this invention is to provide a plastic refractory material with high green and fired strengths and which does not lose its strength upon heating to a temperature below that required for the formation of a ceramic bond.

Still another object of this invention is to provide a binding material which may be used with a porous grog to form an insulating composition.

A further object of this invention is to provide a mortar with good workability and having high green and fired strength.

A still further object of this invention is to provide a mixture of solids which may be stored for extended periods in asphalt lined paper bags and which on addition of water forms a tacky solution capable of setting at moderate temperatures to form a water insoluble bond comprising aluminum sulphate, calcium phosphate and a parting compound to prevent reaction during storage.

Yet another object of this invention is to provide a mixture of solids which may be stored for extended periods in asphalt lined paper bags and which on addition of water forms a tacky solution capable of setting at moderate temperatures to form a water insoluble bond comprising aluminum sulphate, calcium phosphate and a parting compound to prevent reaction during storage in which the parting compound is at least one material with which the mixture is to be ultimately combined.

It is also an object of this invention to provide a bonding material which may be made from cheap, easily available materials and will air set at moderate temperatures to form a water insoluble mass.

The concept of this invention resides in a plastic refractory in which a refractory filler material is mixed with a bonding composition to form a mass which may be stored for long periods when dry, but upon the addition of water forms a tacky, plastic mass capable of setting at moderate temperatures to form a strong material.

The bonding composition made according to this invention consists of a mixture of aluminum sulphate and mono- to di-calcium phosphate.

One source of the mono- to di-calcium phosphate may be the so-called triple superphosphate often used as a fertilizer. This material is prepared by the treatment of calcium phosphate rock with phosphoric acid. Ordinarily triple superphosphate would contain some impurities such as quartz, fluorine, and iron phosphates from the phosphate rock, but these impurities do not impair the properties of the binder.

Calcium phosphates in the desired mono- to di-calcium range may also be obtained from other sources. For instance, a phosphate obtained from the action of phosphoric acid on limestone has been found to be satisfactory. This material is usually of a higher purity than the common triple superphosphate. In most cases, the triple superphosphate will be used in the preparation of the bonding material because of its relatively low cost; however, it is to be understood that calcium phosphate ranging from mono- to di-calcium phosphate may be used regardless of the source from which it is prepared. Throughout the description of this invention, the term "calcium phosphate" will refer to mono- to di-calcium phosphate either in the pure state or as triple superphosphate.

The calcium phosphate and aluminum sulphate may be mixed together in a dry condition without any reaction taking place, thereby providing a dry binder mixture which may be stored for long periods in the ordinary asphalt lined paper bag without deterioration. If commercial aluminum sulphate, which usually contains about 13½ mols of water per mol of the salt, is used, a parting compound must be included in the mixture to prevent reaction between the solid materials. Ordinarily it will be desirable to dry the commercial aluminum sulphate to a water content of 8 mols per mol of salt or less before mixing with the calcium phosphates in order to prevent reaction.

Generally, the ratio of aluminum sulphate to calcium phosphate should be high enough to insure the presence of sufficient sulphate radical to react with all of the calcium present to form $CaSO_4.2H_2O$. If less than this amount of aluminum sulphate is present, some of the bonding properties of the material are lost. On the other hand, large excesses of aluminum sulphate increase the hygroscopicity of the material which increases the difficulty in storing the binder. A binder having excellent physical properties was prepared having approximately the following composition:

| | Per cent |
|---|---|
| Triple superphosphate | 28 |
| Aluminum sulphate | 44 |
| Powdered bauxite | 28 |
| | 100 |

If desired, the bauxite content may be reduced to as low as 10% as indicated in the following example:

| | Per cent |
|---|---|
| Triple superphosphate | 35 |
| Aluminum sulphate | 55 |
| Powdered bauxite | 10 |

Even with the content of bauxite reduced to 10%, this quantity served satisfactorily as a parting compound to prevent damage to the mixture during storage. Thus, any quantity of bauxite in excess of 10% serves adequately as a parting compound. Quantities of bauxite in excess of 10% and even in excess of 28%, as will be seen from subsequent examples herein set forth, adequately serve as satisfactory parting compounds. It seems that the ability of the bauxite to act as a base has the result of attaching itself to the acid calcium phosphate and the aluminum sulphate particles which eliminates to some extent the need for a large amount of parting compound. The ratio of aluminum sulphate to calcium phosphate may, however, be as high as 3 to 1, as is indicated by some of the examples.

In the preparation of plastic refractories or structural materials, clay and/or bauxite will be used in the composition of the material because of its plastic and refractory properties. It is, therefore, possible to include at least a part of the clay in the binder composition as a parting compound.

In other words, when refractory compositions, containing clay, bauxite, grog, and/or other constituents, are compounded with the calcium acid phosphate-aluminum sulphate bond mixture, these refractory constituents form a large amount of effective parting material. No danger will then exist of the material reacting and caking together, if the usual precautions of preventing wetting are taken. Thus the necessity of a parting compound to prevent reaction between the mono- or di-calcium phosphate and the aluminum sulphate will not impair the final product.

When sufficient water is added to the mixture of the mono- to di-calcium phosphate and aluminum sulphate a reaction ensues, producing a tacky mass. It is quite likely that a hydrated colloidal aluminum phosphate of the type described in the applicant's Patent No. 2,405,884 is formed. However, certain advantages in producing a higher strength refractory material requiring less $P_2O_5$ are derived from the use of this invention rather than the aluminum phosphates described in Patent No. 2,405,884, especially when the filler or grog is porous. An example of a plastic refractory prepared according to this invention (sample #1) is shown in Table I compared with a refractory material prepared with a hydrated colloidal aluminum phosphate (sample #2) of the type described in Patent No. 2,405,884.

*Table I*

| Sample No | 1 | 2 |
|---|---|---|
| Minus 4 mesh crushed fire brick grog (porosity about 20%, cone 32)per cent | 70.00 | 70.00 |
| Kaolin (Taco, cone 34)do | 11.25 | 11.25 |
| Ball clay (Ky. No. 5, cone 31)do | 11.25 | 11.25 |
| Aluminum sulphate (13 mols water)do | 5.00 | |
| Triple Superphosphatedo | 2.50 | |
| Water Soluble Aluminum Phosphate, glassy, hydratedper cent | | 6.00 |
| Water | | |
| $P_2O_5$ Content | [1] 1.2 | 2.4 |
| Modulus of rupture, 220° Fp. s. i | 760 | 495 |
| Modulus of rupture, 2000° F | 823 | 694 |
| Pyrometric cone equivalent value | [2] | [3] |

[1] Triple superphosphate has guaranteed 47% $P_2O_5$.
[2] Cone 31 to 32.
[3] Cone 32.

It will be noted in the foregoing table that the refractory grog or filler is the same in both examples as was the amount and type of clay used. The only difference in the plastic refractory in the two examples is in the binder employed. In spite of the lower $P_2O_5$ content, which is a measure of the amount of binder used, of the refractory prepared according to this invention, its strength after heating to 220° F. was approximately 54% higher than the refractory using the water soluble aluminum phosphate. When both specimens were heated to 2000° F., at which temperature approximately all of the water has been driven from the refractory, but no ceramic bond has formed, the refractory prepared according to this invention is 18% stronger than that in which the aluminum phosphate per se was used.

The strength of the refractory can be increased in both of the samples illustrated in Table I by increasing the amount of binder used. Satisfactory plastic materials have been prepared with $P_2O_5$ contents varying from 1 to 5%. The upper limit of binder composition is determined by the workability of the mix. $P_2O_5$ contents above 5% tend to make the mix excessively gummy which impairs its workability. However, $P_2O_5$ is the most expensive component in the refractory and it is highly desirable to use as little as possible and still obtain the necessary green and fired strength. It is, therefore, an important advantage of the present invention to allow the use of relatively small amounts of $P_2O_5$ without causing a serious decrease in the strength of the refractory.

It will be noted that the clay content in the above examples was only 22½%, which is low for a refractory mix. In spite of the low clay content, the plastic workability of the mix before air setting was good. Furthermore, no serious shrinkage occurred upon heating of the refractory to 2000° F. The high shrinkage ordinarily experienced upon heating ceramic masses with high clay content to a temperature which will cause vitrification is minimized by the use of this invention.

The fire brick grog used in the examples of Table I is of a porous nature which ordinarily makes the formation of a satisfactory refractory material difficult. It is, of course, possible to use a more dense grog or refractory filler, but such grogs are usually expensive. Furthermore, most refractory plants have relatively large quantities of waste fire brick grog which must be disposed of; consequently, a binder which may be used with the porous grog and still allow the formation of a refractory having high green strength is highly desirable. Silicate of soda has been employed in some installations, but it is a relatively expensive binder which enhances spalling and also acts as a flux to lower the fusion point of the plastic refractory. There are, of course, other objections to use of sodium silicate, such as the difficulty in storing the material and of blooming through the formation of sodium carbonate from the silicate during storage. The use of aluminum phosphate as a binding material has very important advantages over the sodium silicate. One of the most important of these advantages is the ability to form a water insoluble bonding material from the aluminum phosphate either by heating to moderate temperatures well below that required for vitrification, or by adding insolubilizers.

Many of the advantages in regard to lower costs that are obtained through the use of cheaper porous grogs would be, of course, lost if it was necessary to increase greatly the $P_2O_5$ content of the refractory mass. Not only does this invention reduce the cost per unit weight of the binder, but it also allows smaller quantities of the binder to be used.

Without wishing to be bound to any theory, it is believed that the gypsum formed when the aluminum sulphate and calcium phosphate are mixed and water is added, is deposited in the pores of the grog to block them and prevent the flow of the bond into the grog. Furthermore, the dispersion of colloidal particles of gypsum through the bonding material increases the viscous, colloidal nature of the bonding material and interferes with its flow into the pores of the grog. The theory is substantiated by the improved results which are obtained when the grog has been mixed with the binder at the time the binder constituents are dissolved in water. This would indicate that some advantages are obtained due to the presence of the grog at the time the gypsum is precipitated. Regardless of whether or not this theory is true, it has been possible, by employing a mixture of aluminum sulphate and mono-calcium phosphate, to increase the green and fired strengths of the bonded material over the strengths obtained when using pure, water soluble, aluminum phosphates.

Certain advantages may be obtained if bauxite is used as the parting compound, or in the compounding of a refractory plastic, in place of the clay. The use of bauxite has been found to result in refractories having a higher pyrometric cone equivalent than when ordinary clays are used as shown in the following table:

Table II

| Sample No. | 3 | 4 | 5 |
|---|---|---|---|
| Triple Superphosphate......percent.. | 2.77 | 2.77 | 2.77 |
| Aluminum sulphate............do.... | 8.33 | 8.33 | 8.33 |
| Bauxite.....................do.... | 88.90 | 5.57 | 5.57 |
| Taco Kaolin (cone 34)........do.... |  | 83.33 |  |
| Kentucky #5 Ball Clay (cone 31) percent.. |  |  | 83.33 |
| Pyrometric cone equivalent........... | Above 33 | 32–33 | 28–29 |

Ordinarily bauxite is more expensive than most of the clays used in refractories, but here it is not necessary that the bauxite used be pure. A bauxite containing between 10–20% silica largely in the form of kaolin has been found satisfactory and is as cheap as most refractory clays.

Other advantages are derived from the use of bauxite as a parting compound. Apparently the bauxite is better able than ordinary clays to combat any slight excess acidity that may be present in the triple superphosphate or aluminum sulphate. Binders prepared with bauxite as a parting compound have given excellent results after long periods of storing.

When using porous grog, it has been found difficult to produce a satisfactory insulating ramming mix with high air-setting strength when either aluminum phosphate solution, per se or sodium silicate solution is used. However, when using the mixture of calcium phosphates and aluminum sulphate with a clay parting compound, mixes having satisfactory air setting strength have been obtained even though the grog employed is from a highly porous low density insulating brick. A plastic insulating mass was prepared with the following composition:

Table III

| Sample No. | 6 (rammed) | 7 (cast) |
|---|---|---|
| –2 mesh insulating brick grog (density of 40–45 pounds per cubic foot)...percent.. | 60 | 60 |
| Kaolin type clay.....................do.... | 30 | 30 |
| Aluminum sulphate (13 mols water)..do.... | 6.7 | 6.7 |
| Triple superphosphate................do.... | 3.3 | 3.3 |
| Water in parts by weight per 100 parts of mix........................... | 10–15 | 25–40 |
| Modulus of rupture {at 220° F., p.s.i..... | 140 | ---------- |
| {at 2,000° F., p.s.i..... | 190 | 375 |

In most cases the rammed mixes being of relatively low water content and open structure, can be dried extremely rapidly. In drying the cast materials having a higher water content, however, it is necessary that the drying operation be carried out carefully to prevent bloating as the water vapor is liberated from the mass.

Compositions suitable for ramming or molding have been prepared using exfoliated vermiculite having a particle size from 4-8 mesh in place of the insulating brick grog in the preceding examples. The water content of the mix was adjusted to 25% and the plastic mass then formed was suitable for hand tamping or ramming to form an insulating material having a density of approximately 40 pounds per cubic foot and satisfactory mechanical strength.

In general, the strength of the composition and its density can be controlled to some extent by the compression the plastic refractory is subjected to during the ramming operation. By increasing the compression, the density and the mechanical strength of the refractory or insulating material are increased. Where a very light insulating material is desired and it is not necessary that it have a high mechanical strength, it is, therefore, advisable to use as little compression as possible during the ramming or molding step. In most cases, it will not be possible to use much compression on mixes containing a porous insulating grog without causing the grog to crumble. The cast insulating masses may, therefore, have higher strength than the rammed masses.

Another method of adjusting the density of insulating material is to control the water content. Then after the plastic mix has been either cast or rammed, the elimination of the water from the mass causes voids to develop, thereby decreasing the density of the composition.

A still better method of controlling, and reducing the density of the insulating composition is to use a material having a high combined water content in the compounding of the plastic insulating material. Water is thereby introduced into the composition without causing the mix to become too thin and sloppy as will be the case if the free water is increased. The free and combined water may be removed from the formed section by heating to produce voids throughout the section. For example, if bauxite is used as a parting compound for the binder or in the composition of the insulating material in place of clay, appreciable quantities of combined water are introduced into the composition. The bauxite has a combined water content in the neighborhood of 30% of the weight of the bauxite which may be eliminated on heating to form a structure of low density.

If an insulating material is to be prepared from the composition containing bauxite, the bauxite may be first crushed to approximately 8 mesh and finer. The crushed bauxite is mixed, while dry, with the calcium phosphate and aluminum sulphate comprising the binder. Ordinarily the bauxite will contain sufficient fine material that will slake in water to give the resultant mixture a good workability. Of course, if the composition is to be molded by dry pressing methods, it is not important that the composition have good workability. The aluminum phosphate binder formed by the calcium phosphate and aluminum sulphate usually reacts very slowly with the aluminum tri-hydrate present in the bauxite even after the addition of water; consequently the bonding material prepared from the bauxite retains its plasticity for a considerable length of time. In any event no difficulty is caused by a very rapid rate of setting during molding of the material.

When insulating materials are prepared using a refractory plastic prepared with bauxite, it is sometimes necessary to increase the binder content to 10–15%. If the bauxite is in a very finely divided form, even larger amounts of binder may be required.

After the desired shapes have been formed, the material containing the bauxite is dried and then heated to expel the combined water. The heating operation must be carefully controlled to prevent a violent decomposition of the bauxite which may rupture the formed shapes. The decomposition of the bauxite takes place between 400° C. to 700° C. The elimination of the water from the bauxite produces a porous structure with good insulating properties. The total per cent of voids in the insulating material produced may be as high as 45%. It is apparent that a structural material of low density as well as low thermal conductivity is obtained through the use of material having a high combined water content.

The molded or cast shapes produced from the plastic refractory prepared according to this invention can be made water insoluble by heating or by the addition of basic insolubilizing materials. If basic materials, such as magnesium silicates, lead oxides, calcined magnesia, etc. are added to the mix, the speed of setting to form a cold bond is greatly increased. When these basic materials are included in the mass, it is therefore necessary to work the plastic mix very rapidly after adding water.

In general, the resistance to dissolution by water increases the temperature to which the plastic mass is heated increases. For example, if the mass is heated to 200° F., the composition resists the action of cold water. However, if the mass is heated to 500° F. and above, the molded article then becomes inert to boiling water.

The binder prepared according to this invention may be used to good advantage in the preparation of mortars as well as plastic molding mixes. A mortar suitable for use with refractory brick has been prepared having the following composition:

Table IV

| Sample No. | 8 |
|---|---|
| Flint clay grog, cone 32, minus 40 mesh percent by weight | 68.00. |
| Kaolin, cone 34 percent | 20.00. |
| Aluminum sulphate, 13 mols water do | 9.00. |
| Mono-calcium phosphate (Triple superphosphate) do | 3.00. |
| Modulus of rupture of brick joint (220° F.) p. s. i. | 350. |
| Modulus of rupture of brick joint (2,000° F.) p. s. i. | 187. |
| P. C. E. Value | Cone 32. |

It will be noticed that the modulus of rupture of the mortar is higher at the low temperature than at 2000° F., whereas in the case of the refractory ramming material, the mechanical strength increased slightly on heating. The high plasticity and workability necessary in the mortar requires it to have a water content of 20–25%. On the other hand, the ramming mix need only have a water content of 7–10% for hand ramming and may be less for mechanical ramming and dry pressing. The large amount of water removed on heating the mortar to 2000° F., which is high enough to insure its complete dehydration, results in a decrease in its strength. However, as the temperature increases above 2000° F. and vitrification occurs, the mechanical strength of the mortar increases.

The binder prepared according to this invention may be packed and stored in asphalt lined paper bags for long periods in damp but not wet storage places without deterioration. It is possible that either the binder per se or the ramming mix, which includes the grog with the binder, be stored. Tests were run in which a ramming mixture having the composition of sample 1 in Table I was stored for a three-month period. Water was then added to the mix and a test piece molded. This was compared with the test piece prepared from a fresh mixture of binder and grog with the following results:

*Table V*

| Sample No. | 9 (Initial) | 10 (3 months) |
|---|---|---|
| Modulus of Rupture 220° F ........ p. s. i. | 733 | 760 |
| Modulus of Rupture 2,000° F ..... p. s. i. | 862 | 823 |
| Per Cent Shrinkage at 2,550° F | 2.7 | |

It can be seen that there is no loss in strength of the refractory material resulting from the storage of the mixture.

Throughout this specification, the air setting bond has been described principally with aluminum silicate refractory materials, but its use is not limited thereto. The binder finds equally satisfactory application with refractories, such as chrome or magnesia, and also with minerals such as olivine, talc, feldspar, silica rutile, etc. Since the binder prepared from triple superphosphate and commercial aluminum sulphate is low in cost and may be used in relatively low concentrations, its use is not confined to high cost refractory materials, but may be used in the production of tile and other building materials. By including basic insolubilizing materials in mortars prepared from the binder of this invention, the mortar may be used in installations where a water insoluble material is required, but it is not possible to bake the mortar to give it its insoluble properties.

From the foregoing, it will be appreciated that the present invention provides a mortar having excellent refractory properties. The refractory may be stored for long periods without deteriorating and upon admixture with water will form a plastic material capable of setting in air to form a strong bond.

In contrast with refractories relying on sodium silicate to increase the green strength of the material, the present invention provides a material which will not lose its strength on exposure to an atmosphere containing carbon dioxide. Furthermore, on repeated heating to temperatures where a ceramic bond is formed, the phosphate bond does not embrittle and crack as does the bond containing a high percentage of alkali from the sodium silicate.

The plastic refractory herein described has a higher air setting and fired strength than materials prepared from water soluble aluminum phosphates. Apparently the precipitation of gypsum throughout the bonding material blocks the pores of the grog used in the refractory and allows the use of a lower aluminum phosphate content without impairing the strength of the bond. Important savings in the cost of the refractory are consequently made available.

From the foregoing, it will be appreciated that the quantity of bauxite incorporated with the mixture of aluminum sulphate and calcium phosphate may range from about 10–89%. On the other hand, when clay is used, the quantity may range from about 20 to about 83.33% of the mixture. In either case, the material within the ranges given will serve satisfactorily as a parting compound.

While this invention has been specifically described with reference to specific compositions and uses of the composition, it should be understood that the invention is not to be restricted to the specific details thereof, but should be limited only by the appended claims.

I claim:

1. A mixture of solids which may be stored for extended periods in asphalt lined paper bags and which on addition of water forms a tacky solution capable of setting at moderate temperatures to form a water insoluble bond comprising aluminum sulphate, a parting compound selected from the group consisting of clay and bauxite, and calcium phosphate ranging from mono- to di-calcium phosphate, the ratio of the aluminum sulphate to the calcium phosphate ranging from about 2:1 to about 3:1, and the parting compound when bauxite is used ranging from 10% to 88.9% and when clay is used, ranging from 20% to 83.33% of the mixture.

2. A mixture of solids which may be stored for extended periods in asphalt lined paper bags and which on addition of water forms a tacky solution capable of setting at moderate temperatures to form a water insoluble bond comprising kaolin, aluminum sulphate, and calcium phosphate ranging from mono- to di-calcium phosphate, the ratio of the aluminum sulphate to the calcium phosphate ranging from about 2:1 to about 3:1, the kaolin ranging from 20 to 83.33% of the mixture.

3. A plastic composition having high green strength and capable of setting at a moderate temperature to form a water insoluble material consisting essentially of fire brick grog, kaolin and ball clay as the plasticizer therefor, aluminum sulphate, and calcium phosphate ranging from mono- to di-calcium phosphate, the ratio of the aluminum sulphate to the calcium phosphate ranging from about 2:1 to about 3:1, the calcium phosphate providing a $P_2O_5$ content of about 1–5% of the total mixture.

4. A method of forming refractory sections comprising mixing calcium phosphate ranging from mono- to di-calcium phosphate, aluminum sulphate, a refractory filler and clay as the plasticizer therefor, adding water to the mixture whereby a tacky, plastic mass containing finely divided calcium sulphate is formed, forming the mass into the desired shape, and allowing the mass to air-set, the ratio of the aluminum sulphate to the calcium phosphate ranging from about 2:1 to about 3:1, the calcium phosphate providing a $P_2O_5$ content of about 1–5% of the total mixture.

5. A method of forming refractory sections comprising mixing calcium phosphate ranging from mono- to di-calcium phosphate, aluminum sulphate, a refractory filler and clay as the plasticizer therefor, adding water to the mixture whereby a tacky, plastic mass containing finely divided calcium sulphate is formed, forming the mass into the desired shape, and baking the section to harden the mass, the ratio of the aluminum sulphate to the calcium phosphate ranging from about 2:1 to about 3:1, the calcium phosphate providing a $P_2O_5$ content of about 1–5% of the total mixture.

6. A method of forming refractory sections comprising mixing calcium phosphate ranging from mono- to di-calcium phosphate, aluminum sulphate, a refractory filler and clay as the plasticizer therefor, adding water to the mixture whereby a tacky, plastic mass containing finely divided calcium sulphate is formed, forming the mass into the desired shape, allowing the mass to air-set, and firing the section to form a ceramic bond, the ratio of the aluminum sulphate to the calcium phosphate ranging from about 2:1 to about 3:1, the calcium phosphate providing a $P_2O_5$ content of about 1–5% of the total mixture.

7. A method of forming refractory sections comprising mixing calcium phosphate ranging from mono- to di-calcium phosphate, aluminum sulphate, a refractory filler and clay as the plasticizer therefor, adding water to the mixture whereby a tacky, plastic mass containing finely divided calcium sulphate is formed, forming the mass into the desired shape, baking the section to harden the mass, and firing the section to form a ceramic bond, the ratio of the aluminum sulphate to the calcium phosphate ranging from about 2:1 to about 3:1, the calcium phosphate providing a $P_2O_5$ content of about 1–5% of the total mixture.

8. An insulating material consisting essentially of bauxite, aluminum sulphate and calcium phosphate ranging from mono- to di-calcium phosphate, said aluminum sulphate and calcium phosphate forming a tacky binder on the addition of water to give a plastic mass for fabrication of structures, the ratio of the aluminum sulphate to the calcium phosphate ranging from about 2:1 to about 3:1, the calcium phosphate providing a $P_2O_5$ content of about 1–5% of the total mixture.

9. A method of forming insulating sections comprising mixing bauxite, aluminum sulphate and calcium phosphate ranging from mono- to di-calcium phosphate, adding water to the mixture to obtain the desired workability, forming the material to the desired shape, and heating the material to drive off the combined water from the bauxite, the ratio of the aluminum sulphate to the calcium phosphate ranging from about 2:1 to about 3:1, the calcium phosphate providing a $P_2O_5$ content of about 1–5% of the total mixture.

10. A mixture of solids which may be stored for extended periods in asphalt lined paper bags and which on addition of water form a tacky solution capable of setting at moderate temperatures to form a water insoluble bond comprising aluminum sulphate, triple superphosphate and a parting compound selected from the group consisting of clay and bauxite, the ratio of the aluminum sulphate to the triple superphosphate ranging from about 2:1 to about 3:1, and the parting compound when bauxite is used ranging from 10 to 88.9% and when clay is used, ranging from 20% to 83.33% of the mixture.

HERBERT H. GREGER.

No references cited.